No. 866,600. PATENTED SEPT. 17, 1907.
G. C. RICHARDS.
COMBINED STAMP AND GRINDING MILL.
APPLICATION FILED JUNE 13, 1906.

2 SHEETS—SHEET 1.

WITNESSES:

INVENTOR
George C. Richards,
BY
Geo. H. Strong
ATTORNEY

No. 866,600. PATENTED SEPT. 17, 1907.
G. C. RICHARDS.
COMBINED STAMP AND GRINDING MILL.
APPLICATION FILED JUNE 13, 1906.

2 SHEETS—SHEET 2.

WITNESSES:

INVENTOR
George C. Richards.
BY
Geo. H. Strong.
ATTORNEY

UNITED STATES PATENT OFFICE.

GEORGE C. RICHARDS, OF SOUTH BERKELEY, CALIFORNIA, ASSIGNOR TO WESTERN MILL AND MACHINE COMPANY, A CORPORATION OF CALIFORNIA.

COMBINED STAMP AND GRINDING MILL.

No. 866,600.      Specification of Letters Patent.      Patented Sept. 17, 1907.

Application filed June 13, 1906. Serial No. 321,477.

*To all whom it may concern:*

Be it known that I, GEORGE C. RICHARDS, a citizen of the United States, residing at South Berkeley, in the county of Alameda and State of California, have invented new and useful Improvements in a Combined Stamp and Grinding Mill, of which the following is a specification.

My invention relates to improvements in quartz and like mills. Its object is to provide a practical durable mill of simple construction and large capacity which shall combine the grinding and amalgamating features of an arrastre and the crushing features of a stamp mill.

The invention consists of the parts and the construction and combination of parts as hereinafter more fully described and claimed, having reference to the accompanying drawings, in which—

Figure 1:
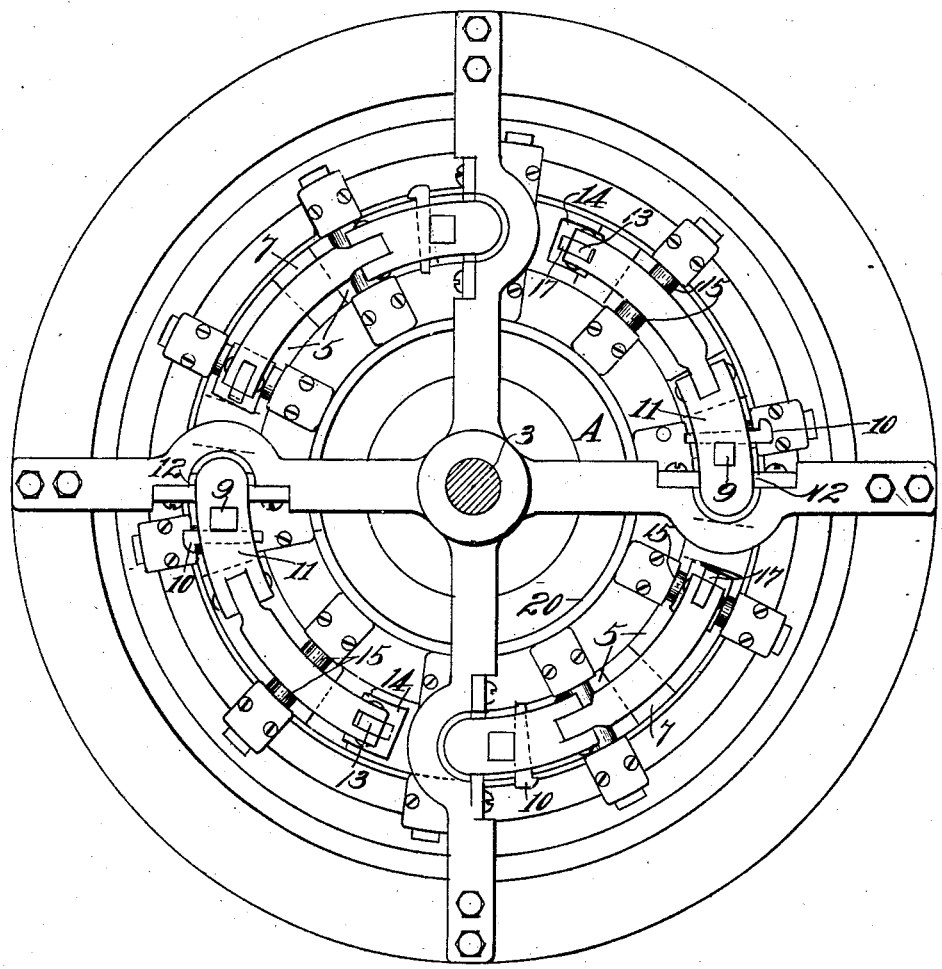
Figure 2:
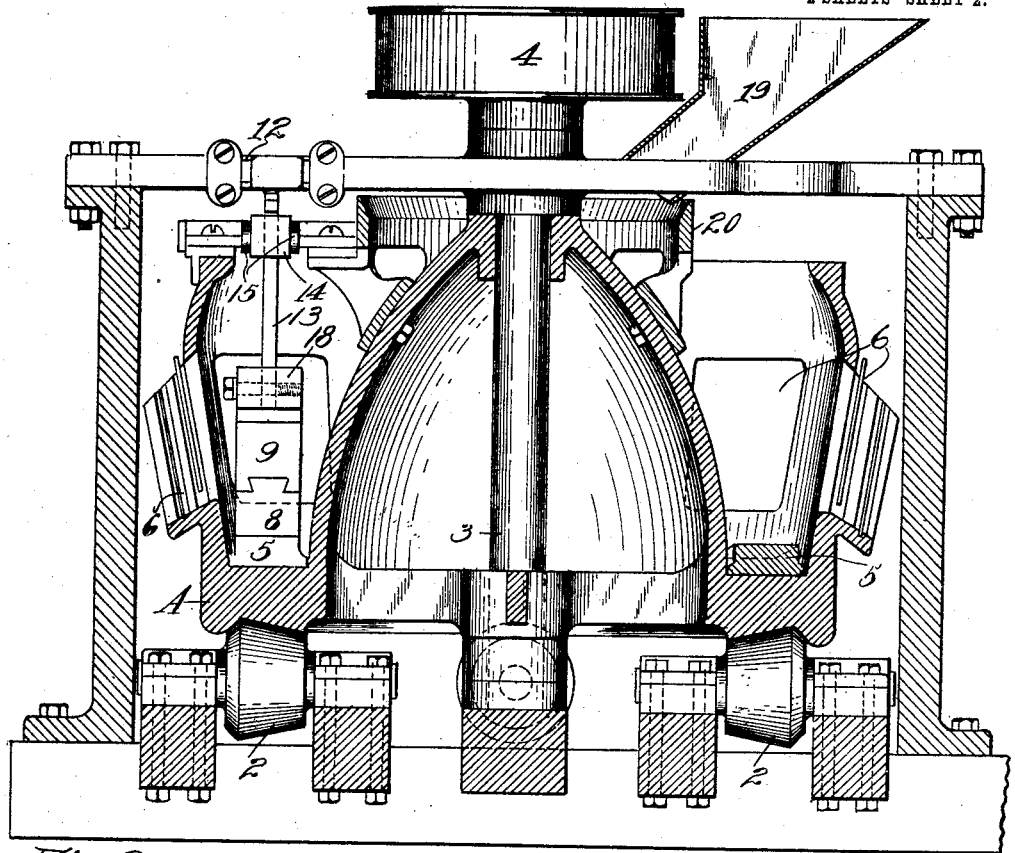
Figure 3:
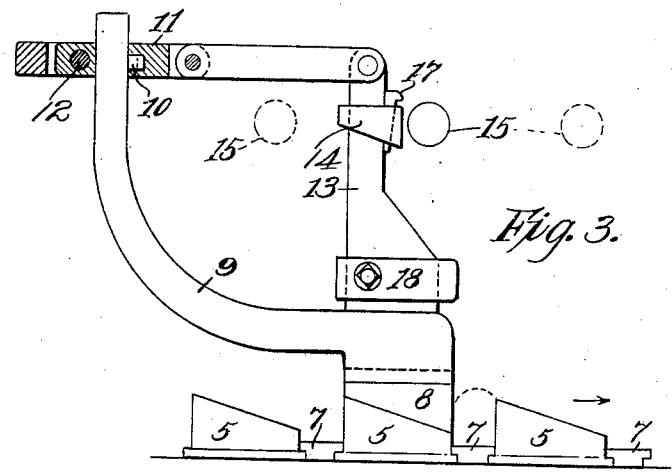

Figure 1 is a top plan view of my invention. Fig. 2 is a vertical section thereof, and Fig. 3 is a rectilinear projection of a series of dies and a stamp.

A represents a mortar or pan of the circular type suitably mounted for revolution on the rollers 2, and revolved at suitable speed from any appropriate source of power through the medium of the central shaft 3, and pulley 4. The mortar, or pan as I prefer to call it, is of suitable size and weight, and has an annular trough in which are located the removable dies 5. The inner wall of the trough is made conical as shown, and the outer wall is provided with the screen openings 6. The dies are separated and suitably spaced by means of the removable plates 7. The trough is concentric with the axis of rotation of the pan, and the latter is adapted to be revolved with respect to the crushing and grinding devices, in contradistinction to mills of this class where the pan is generally stationary, and the grinders and crushers revolve.

Each grinder and stamp comprises a removable shoe 8 having an inclined underneath wearing surface corresponding to the top wearing surface of the dies 5; each shoe being carried by an arm 9 which has a curved horizontal portion, and a straight vertical portion, adjustable by a key 10 in a link bar 11 which is hinged to a stationary part of the apparatus as at 12; the bar 11 connects pivotally with a stud 13 which extends upward from the rear end of the arm 9. A cam collar 14 is adjustably secured to the part 13 and is engageable by successively arranged devices as the rollers 15, in the rotation of the pan to lift the stamp as the latter is about to leave one die and to drop it at the proper moment on to the next die. The rollers 15, which are suitably supported on the pan, are disposed in pairs on both sides of the trough, and on both sides of the arc of travel of the arms; and the rollers are so positioned that no two successive pairs will engage or drop their stamps at the same time; the idea being to regulate the drop of the several stamps so that the load will remain approximately uniform.

If it were not for some such means as are provided by the rollers and adjustable cams 14, the shoes would rapidly wear away and become rounded on their upper corners. As it is a stamp is allowed to ride up the major part of the incline of a die, with the entire weight of a stamp resting on the die. As a stamp is about to leave the die the cam 14 encounters a pair of rollers 15, and momentarily the direction of travel of the stamp is continued upward; but as the stamp comes over or nearly over the next die, the cam leaves the rollers, and the stamp drops with all its crushing force directly upon the ore contained between the shoe and die. The crushing action caused by the sudden drop of the stamp is succeeded each time by the grinding action of the shoe on the die.

As a shoe or the dies become worn, the cam may be suitably adjusted by means of the key 17; at the same time the arm 9 can be dropped down from time to time by loosening up key 11 so as to maintain the wearing bottom surface of the shoe parallel with the corresponding surface of the dies.

The weight of the stamp may be varied to suit different conditions, by means of the weights 18, which are adapted to straddle a stud 13, and are held fixedly in position by any suitable means.

The ore to be crushed is fed in any convenient manner into the interior of the pan, as through the hopper 19 having its discharge end arranged inside the arc of travel of the stamps. An annular plate 20 prevents the material from the hopper coming in contact with the rollers 15. The pan is revolved at suitable speed, but not so rapidly as to cause any material amount of centrifugal action, such as might cause the contained ore and water to travel away from the proper areas of action of the dies and shoes. The splash caused by the constant dropping of the stamps drives the pulp through the screen opening 6, to be later suitably collected and concentrated.

Having thus described my invention, what I claim and desire to secure by Letters Patent is—

1. A stamp mill having in combination a rotary pan said pan having a trough the outer wall of which is provided with openings for the delivery of crushed material, and the inner wall forming a central cone, a driving shaft passing through the center of said cone and fixed to said cone, a series of successively arranged die-members in said trough, a stamp-member, a fixed support on the pan, and means forming a horizontal hinge about which said stamp-member may rise and fall to engage successive of said die-members.

2. In a stamp mill the combination of a rotary pan having an annular trough one wall of which is provided with delivery openings and the opposite wall forms a central cone, a drive shaft passing through and fixed to said cone, a series of die-members successively arranged in said trough, a fixed support extending transversely above the pan, a stamp-member hingedly mounted and capable of substantially trailing over said die-members, and means carried by the pan and independent of the die-members for raising the stamp-member and then allowing it to drop upon a die-member.

3. In a stamp mill the combination of a rotary pan provided with an annular series of successively arranged die-members having inclined faces a stamp-member hingedly-mounted and adapted to substantially trail over the inclined faces of said die-members, and means for vertically elevating the stamp-member as it is about to leave the face of one die-member, said elevating means releasing the stamp-member substantially coördinate with its arrival over a succeeding die-member.

4. In a stamp mill the combination of a rotary pan having an annular series of successively arranged die-members provided with inclined faces, a stamp-member hingedly mounted and capable of substantially trailing over the inclined faces of said die-members, and means including a cam and a contact-member between the pan and the stamp-member, said means elevating the stamp-member as it is about to leave the inclined face of one die-member, and said elevating means releasing the engaged stamp-member substantially coördinate with the arrival of the latter over a succeeding die-member.

5. In a stamp mill, a pan having an annular trough provided with openings on one side, a series of removable die members in said trough, an adjustable vertically movable stamp member hinged to a fixed support and engageable by successive of said die members, an adjustable cam on said stamp member and means on the pan engageable with said cam to support said stamp member in elevated position.

6. In a stamp mill, a pan having an annular trough, dies in the trough having inclined wearing surfaces, stamps having correspondingly inclined shoes engageable with said dies successively, means to cause the successive engagement of the shoes and dies, said shoes mounted to have a drop movement from one die to the next, cams carried by the stamps and rollers intermittently engaged by the cams to support the stamps independent of the dies.

In testimony whereof I have hereunto set my hand in presence of two subscribing witnesses.

GEORGE C. RICHARDS.

Witnesses:
EDWARD A. HOLMAN,
HANSFORD B. GRIFFITH.